(12) United States Patent
Chandy et al.

(10) Patent No.: US 8,528,686 B2
(45) Date of Patent: Sep. 10, 2013

(54) METHODS AND SYSTEMS INVOLVING ELECTROMAGNETIC TORSION BARS

(75) Inventors: Ashok Chandy, Fenton, MI (US); Mohammad S. Islam, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 12/333,802

(22) Filed: Dec. 12, 2008

(65) Prior Publication Data
US 2010/0147619 A1    Jun. 17, 2010

(51) Int. Cl.
*B62D 5/04* (2006.01)
(52) U.S. Cl.
USPC ............................. 180/422; 335/220; 310/115
(58) Field of Classification Search
USPC ................. 464/23, 29; 73/862.334, 862.336, 73/862.08; 180/446, 444, 443
See application file for complete search history.

(56) References Cited

U.S. PATENT DOCUMENTS

| 4,004,081 | A  | * | 1/1977  | Zorn .......................... 369/44.19 |
| 5,070,956 | A  |   | 12/1991 | Pawlak et al. |
| 5,454,439 | A  |   | 10/1995 | Birsching |
| 6,353,275 | B1 | * | 3/2002  | Nishiyama et al. ...... 310/156.53 |
| 6,863,614 | B2 | * | 3/2005  | Viola .............................. 464/23 |
| 7,047,824 | B2 | * | 5/2006  | Nakane et al. ........... 73/862.331 |
| 7,364,006 | B2 | * | 4/2008  | Birsching et al. ............ 180/441 |
| 2006/0249326 | A1 | * | 11/2006 | Birsching et al. ............ 180/422 |

FOREIGN PATENT DOCUMENTS

DE       102005011196 A1    9/2006

OTHER PUBLICATIONS

European Search Report and Office Action dated Jun. 8, 2010 for European Application No. 09015433.7.
Examination Report of the EPO, dated Sep. 12, 2012; 5 pages.

* cited by examiner

*Primary Examiner* — Tony Winner
*Assistant Examiner* — Jacob Knutson
(74) *Attorney, Agent, or Firm* — Cantor Colburn LLP

(57) ABSTRACT

An actuator assembly including, a polar assembly including an inner tooth and an outer tooth, and a magnet disposed between the inner tooth and the outer tooth, the magnet operative to interact with the polar assembly to induce an electromagnetic torsion bar operative to impart a torque on a first shaft connected to the ring magnet.

17 Claims, 6 Drawing Sheets

METHODS AND SYSTEMS INVOLVING ELECTROMAGNETIC TORSION BARS

BACKGROUND

Power steering systems in vehicles use actuators to provide assist and sometime include capabilities such as variable effort steering and torque overlay to provide a desired response in the systems.

Many actuators use a torsion bar disposed within a valve to control the valve or other input measuring device as a function of torque, and to a provide tactile feedback to the driver at the hand wheel.

SUMMARY

The above described and other features are exemplified by the following Figures and Description in which actuators are disclosed that include an actuator assembly including, a polar assembly including an inner tooth and an outer tooth, and a magnet disposed between the inner tooth and the outer tooth, the magnet operative to interact with the polar assembly to induce an electromagnetic torsion bar operative to impart a torque on a first shaft connected to the magnet.

BRIEF DESCRIPTION OF THE DRAWINGS

Referring now to the Figures wherein like elements are numbered alike.

DETAILED DESCRIPTION

Power steering systems may incorporate a torsion bar in hydraulic and electric actuators. The torsion bar typically provides a means to measure driver torque by sensing the deflection of the torsion bar. In addition, the torsion bar also provides the necessary torque coupling between the driver the rest of the steering system, thus providing a desired tactile "feel" to the user. Hydraulic and electric actuators may be magnetically actuated. For example, a magnetically actuated actuator includes a ring magnet and poles that rotate when a magnetic flux is induced.

Figure 1:
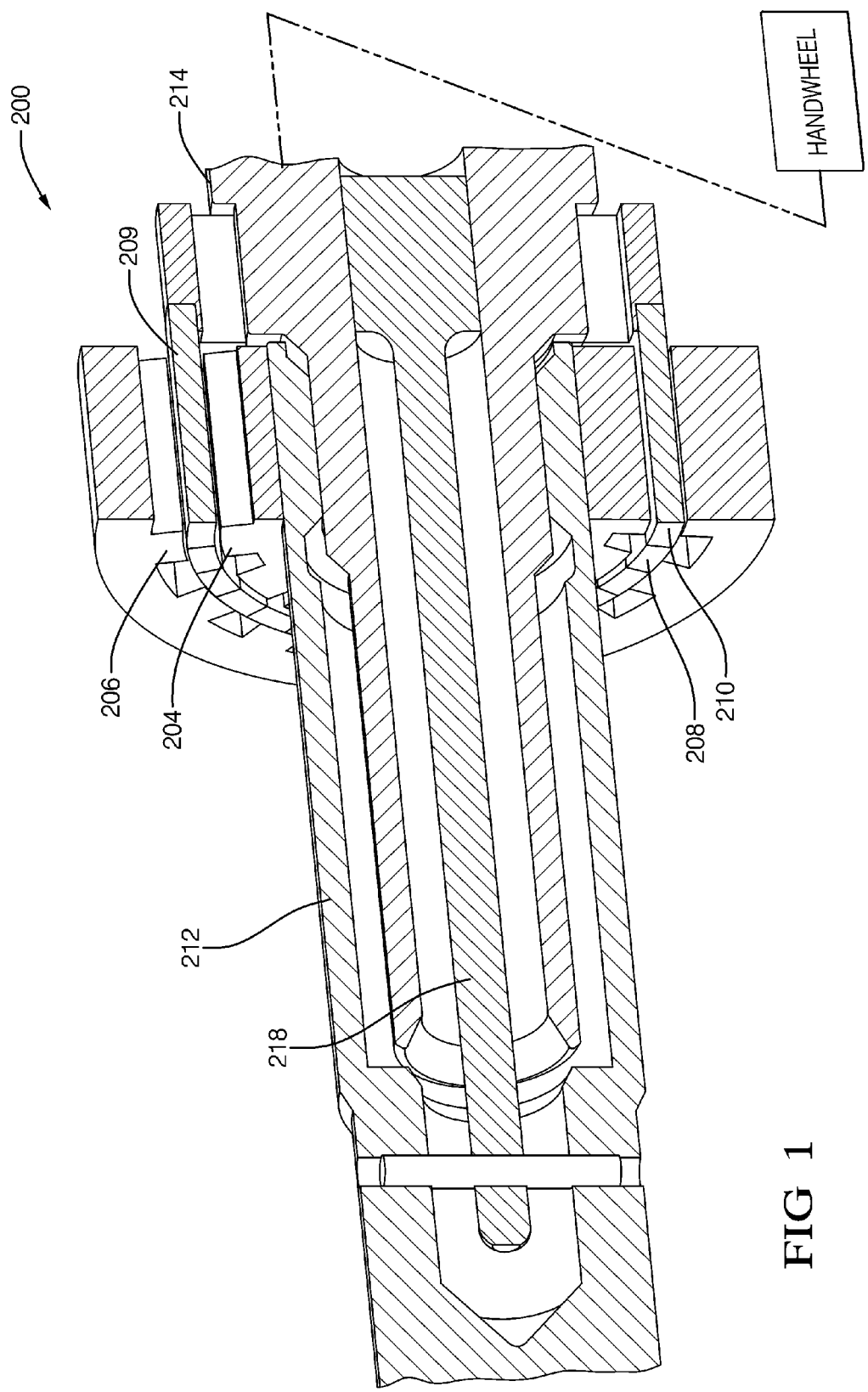
FIG. 1 illustrates an exemplary embodiment of the magnetic torsion bar of an actuator assembly.

FIG. 1 illustrates the magnetic torsion bar assembly 200 of a typical electric or hydraulic steering system. The magnetic torsion bar assembly 200 includes a steering shaft 214 connected to a handwheel (not shown) and a ring magnet 209. The ring magnet 209 includes magnetic poles 208 and 210. Inner teeth 204 and outer teeth 206 are connected to an output shaft 212.

The magnetic portion 200 includes 15 pairs of teeth, however other embodiments may include other teeth arrangements. A pair of teeth includes an inner tooth 204 and an outer tooth 206. The magnet 209 may be a single piece ring magnet with 15 pairs of poles. Alternatively, the magnetic pole 208 and 210 pairs may be fabricated using multiple magnets attached in a desirable pattern. Each pair of poles includes a north pole and a south pole.

In operation, a driver input from a handwheel connected to the steering shaft 214 rotates the steering shaft 214. The steering shaft 214 rotates the ring magnet 209. Flux forces in the ring magnet 209 impart a torque on the inner teeth 204 and the outer teeth 206. The torque rotates the inner teeth 204 and the outer teeth 206 and rotates the connected output shaft 212.

The assembly 200 include a mechanical torsion bar 218 disposed in a center cavity of the steering shaft 214. The torsion bar is connected to the output shaft 212 and the steering shaft 214. The torsion bar imparts a torque on the handwheel that provides a tactile response to the driver. In addition, the torsion bar ensures that the valve opening for a hydraulic power steering system is controlled as a function of the driver torque. In an electric power steering system, the deflection of the torsion bar is usually sensed with an electrical device. One disadvantage of an actuator assembly that uses a torsion bar is that the fabrication of the actuator assembly may be costly. For example, the center of the valve body is machined to align with the center of the torsion bar and a center of the magnetic actuator portion. The actuator assembly is machined or assembled to high tolerances that result in costly production procedures and waste. In certain applications, it may be desirable to have a non-linear or variable stiffness characteristic for improved steering feel and performance. The non-linear or variable stiffness characteristics are difficult to implement using a mechanical torsion bar.

The assembly 200 and the additional embodiments described below may be more easily fabricated without a torsion bar 218. If the torsion bar 218 is removed, a new method for providing the function of a torsion bar 218 is desired. The assembly 200 allows the torque response of a torsion bar 218 to be imparted by the magnetic actuator portion. Alternatively, the assembly 200 may include the torsion bar 218 to supplement its behavior with non-linear or variable stiffness characteristics.

The magnetic interaction between the ring magnet 209 and the inner teeth 204 and outer teeth 206 is designed to impart a torque response similar to the mechanical torsion bar of previous systems. The torque used to replicate a mechanical torsion bar is called an electromagnetic torsion bar.

By using the electromagnetic torsion bar to impart a similar torque as the mechanical torsion bar, the mechanical torsion bar may be removed from the actuator. This simplifies the fabrication of the actuator.

Figure 2A:
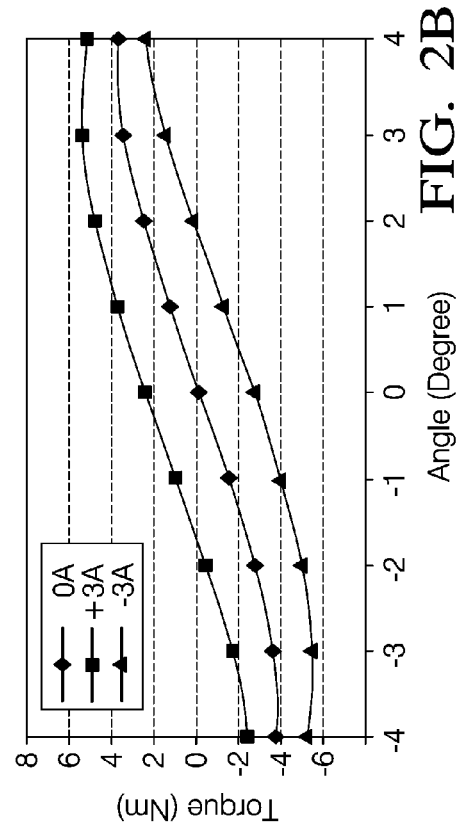
FIGS. 2A-2D illustrate exemplary graphs of behavior of embodiments of magnetic torsion bars.

FIG. 2A illustrates a comparison of the torque induced by a mechanical torsion bar (Tbar) and the torque induced by an electromagnetic torsion bar. The EM torque curves represent the torque induced in rotating the magnetic actuator portion, and the Tbar torque curve represents the torque induced by a mechanical torsion bar.

Typically, the range of motion of the torsion bar is limited to a maximum range of about +/−4 degrees via the use of travel stops. Thus, the use of electromagnetic torque to approximate the torque induced by a mechanical torsion bar over this range effectively allows a mechanical torsion bar to be removed or supplemented using this device.

Figure 3:
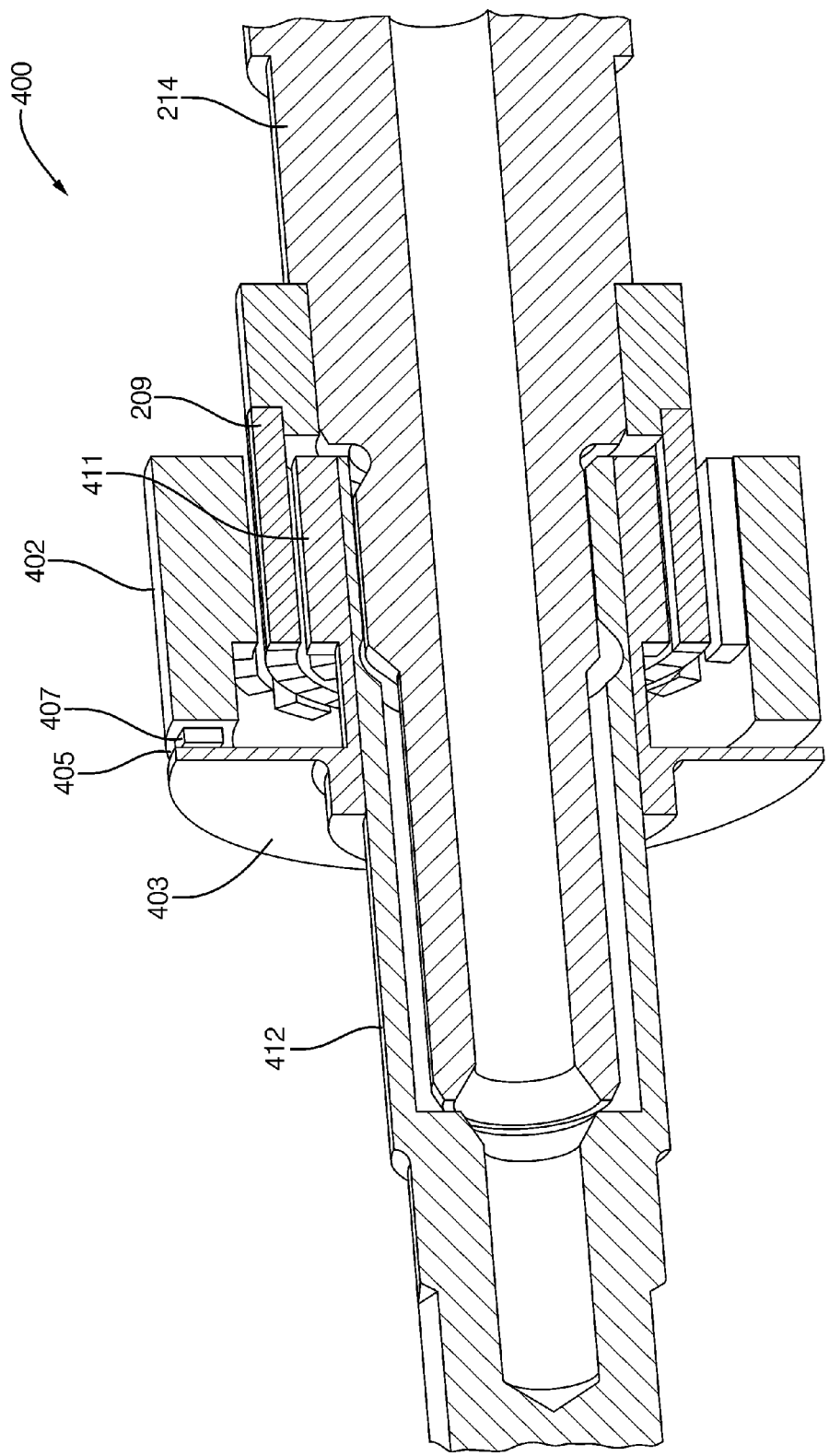
FIG. 3 illustrates an alternate exemplary embodiment of a magnetic torsion bar of an actuator assembly.

FIG. 3 illustrates an exemplary embodiment of magnetic actuator portion 400 having an electromagnetic torsion bar. The magnetic actuator portion 400 is similar in structure and operation to the magnetic actuator portion 200 described above.

Determining the torque applied to upper input shaft 214 described above is desirable. The use of a separate torque sensing unit is undesirable because it adds a component to the system increasing cost and the use of space.

Figure 4:
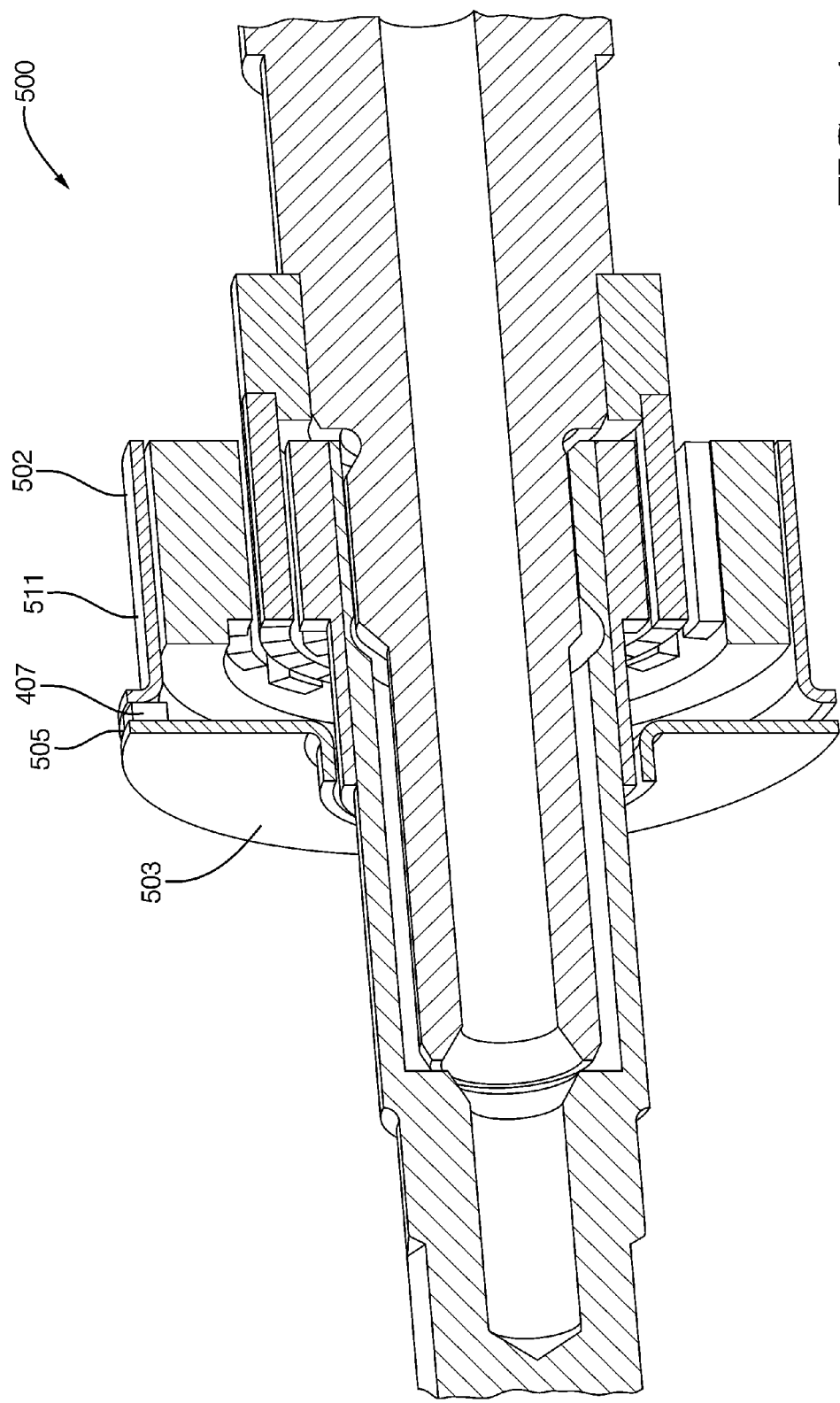
FIG. 4 illustrates another alternate exemplary embodiment of a magnetic torsion bar of an actuator assembly.

FIG. 4 includes a magnetic sensor 407, an outer yoke portion 402, an inner yoke portion 411, and a plate portion 403. The plate portion 403 and the inner yoke portion 411 are connected to the shaft 412. The outer yoke portion 402 and the plate portion 411 define an airgap 405. The airgap 405 is a cavity that contains the magnetic sensor 407 that includes a magneto-sensitive element, such as, for example a Hall Effect sensor. The airgap 405 may contain a number of magneto-sensitive elements.

In operation, the sensor 407 detects a relative angular displacement between the ring magnet 209 and the teeth by sensing a change in flux as the ring magnet 209 rotates. The relative angular displacement may be converted to a torque value. The use of a magneto-sensitive element allows the torque to be determined without using a separate sensing unit. An advantage of the embodiment of FIG. 4 is that the packaging size of the actuator is reduced.

Figure 5:
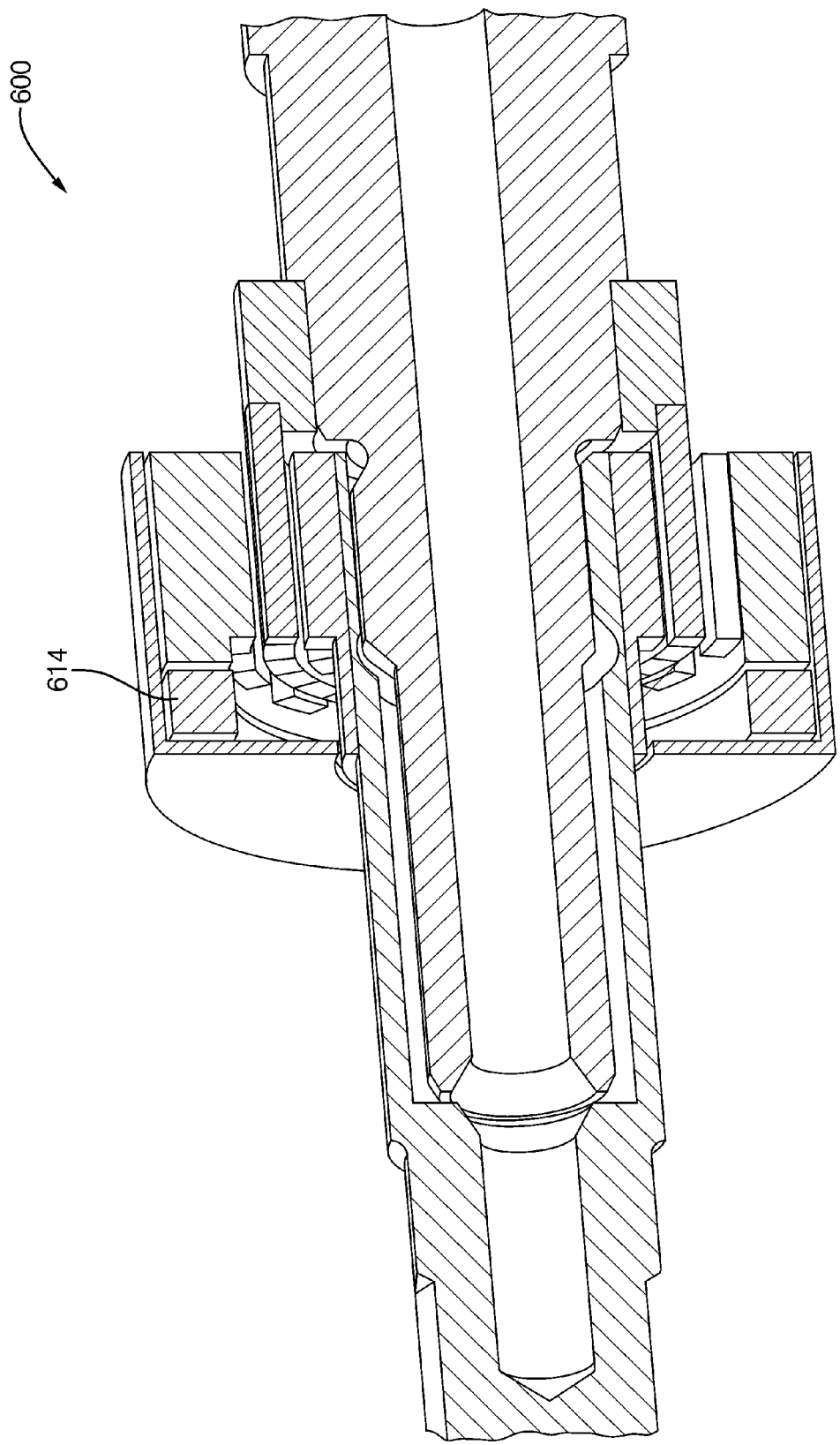
FIG. 5 illustrates another alternate exemplary embodiment of a magnetic torsion bar of an actuator assembly.

FIG. 5 illustrates an embodiment of a magnetic actuator portion 500. The magnetic actuator portion 500 is similar to the magnetic actuator portion 400 described above. The magnetic actuator portion 500 includes an outer housing portion 502. The outer housing portion 502 remains stationary relative to the rotation of the magnetic and shaft portions of the magnetic actuator portion 500. The outer housing portion 502 includes an upper outer housing portion 511 and a lower outer housing portion 503 that partially define an airgap 505. The airgap provides a cavity for the position sensor 407 that operates as described above. The relative angular displacement may be converted to a torque value.

In some steering systems a change in stiffness felt at the handwheel by a user is desirable as the user rotates a handwheel through a range of motion. For example, a system may be designed to have a non-linear stiffness characteristic with a stiff tactile feel when the handwheel is centered during high-speed driving, and a more compliant tactile feel when steering at higher efforts off-center, typically encountered during parking and low speed maneuvers. This is accomplished by designing the shape of the curve in FIG. 2A to a desired target stiffness. Alternatively, it may be desirable to have the stiffness variable with driving conditions such as vehicle speed. Variable stiffness as a function of driving conditions is complex to achieve using a mechanical torsion bar. However, the variable stiffness function may be incorporated into the magnetic actuator portion using a coil.

Figure 6:
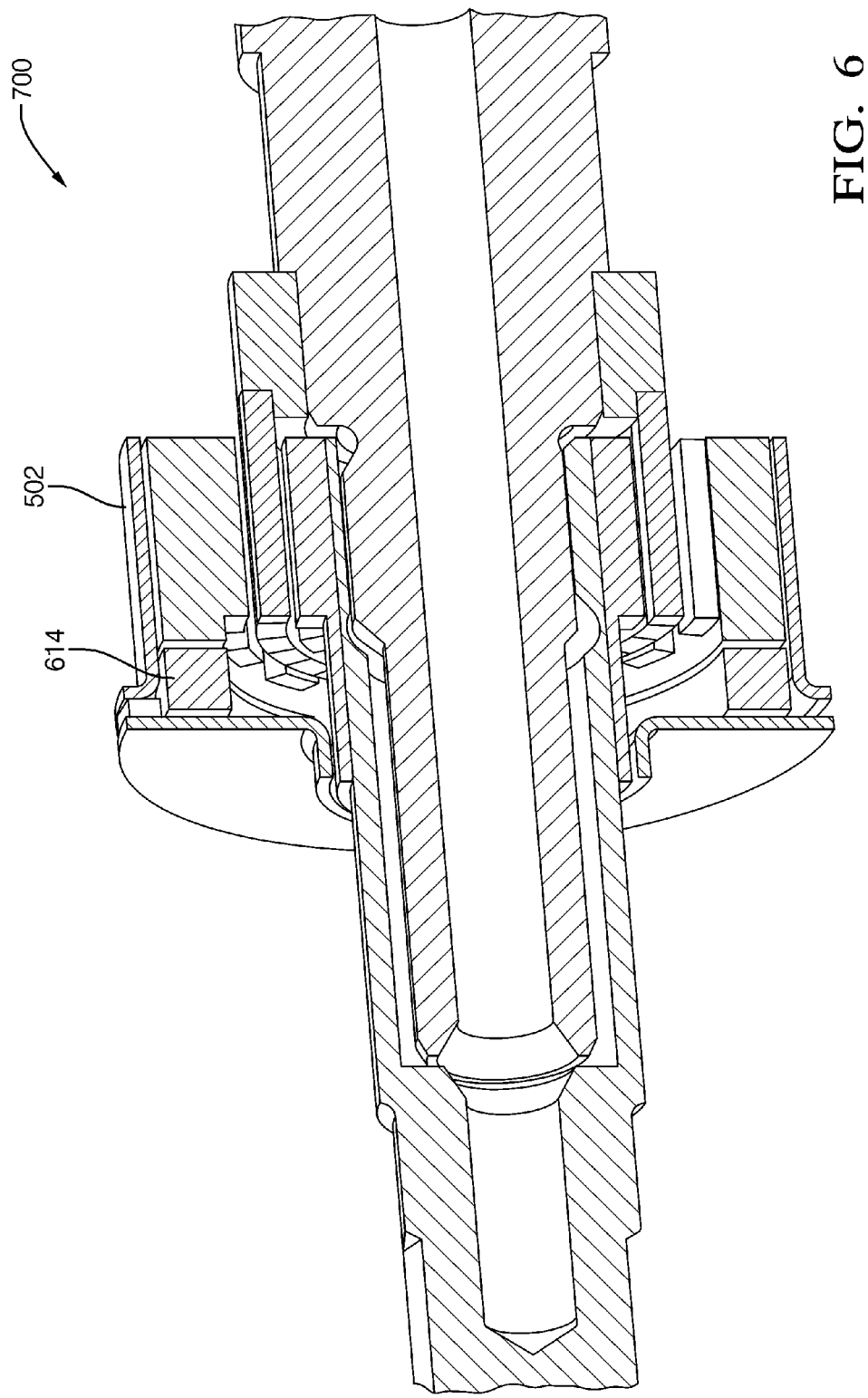
FIG. 6 illustrates another exemplary embodiment of a magnetic torsion bar of an actuator assembly.

FIG. 6 illustrates an exemplary embodiment of a magnetic actuator portion 600 that includes a coil 614. The magnetic actuator portion 600 is similar to the magnetic actuator portion 200 (of FIG. 1). The coil 614 induces a secondary field in the magnetic actuator portion 600.

Figure 2B:
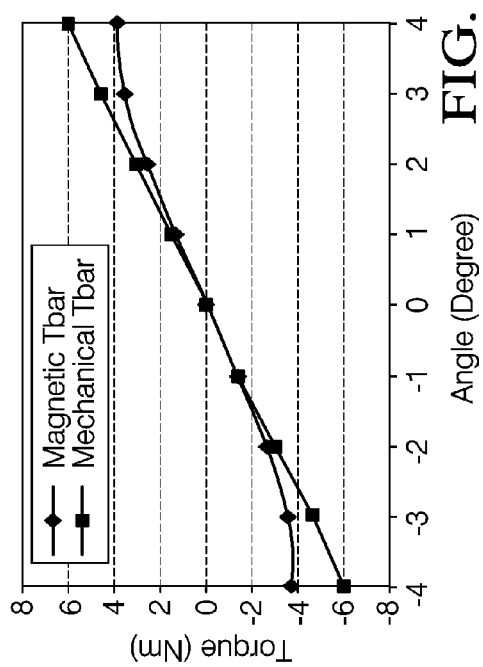
Figure 2C:
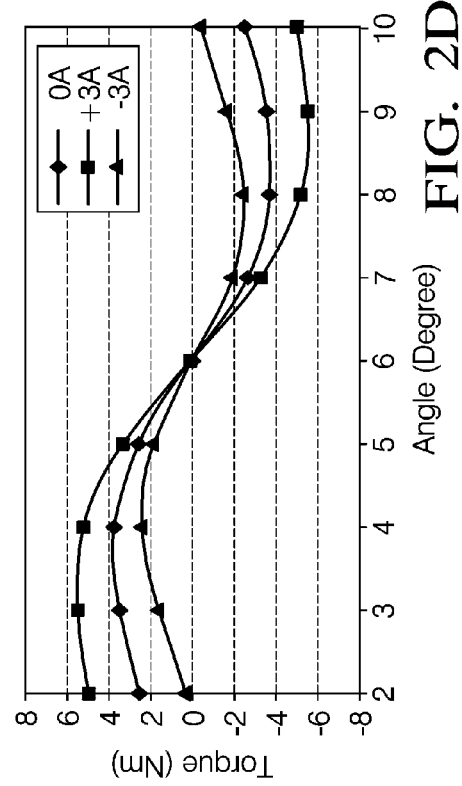
Figure 2D:
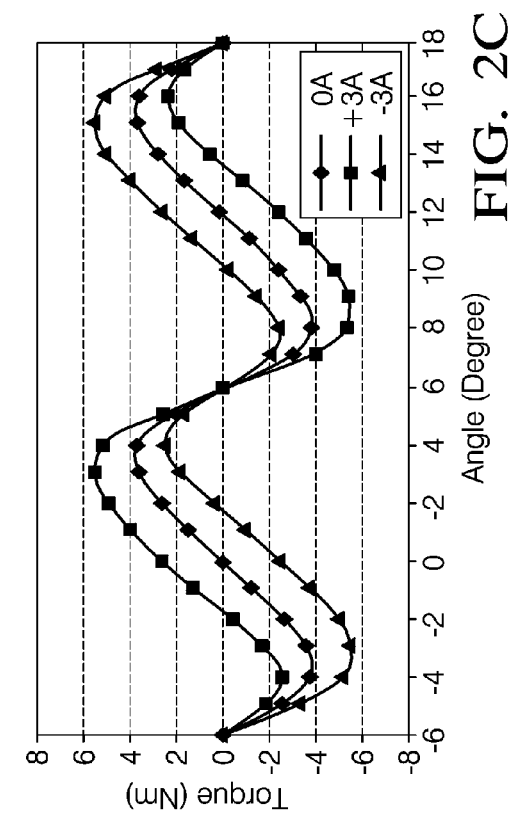

FIG. 2C illustrates a behavior of the interaction force between the pole piece and the ring magnet (illustrated above). When the coil is energized, it imparts an additional electromagnetic force between the pole piece and the ring magnet with the resulting response shown in FIG. 2C as a function of current. If operated with a mechanical center around the 6 degree angle the variable stiffness behavior of the system is realized between travel stops as shown in FIG. 2D. If operated with a mechanical center around the 0 degree angle the torque overlay behavior of the system is realized between travel stops as shown in FIG. 2B.

In some embodiments, it may be desirable to apply a torque on the torsion bar, for example to automate steering for parking assist in hydraulic systems. In this case, the magnetic torque created by the coil may be designed to produce a different effect by choosing a different operating point on the magnetic torque curve as shown in FIG. 2C. Here the mechanical center is placed to be the same as the magnetic center of the plot in FIG. 2C and thus realizes a variable torque overlay device between typical travel stops as shown in FIG. 2B.

The use of an electromagnetic torsion bar simplifies the application of torque overlay. The current command used to operate the actuator changes the stiffness of the actuator as felt by a user as the actuator rotates. The change in stiffness (variable stiffness) may be controlled by manipulating the cogging torque thereby varying the torque of the electromagnetic torsion bar.

FIG. 6 illustrates an embodiment of a magnetic actuator portion 700 that includes the coil 614 (of FIG. 5) and the outer housing 502 (of FIG. 4). The magnetic actuator and torque sensing portion 700 is similar to the magnetic torsion bar and torque sensing portion 500 described above and uses the coil 614.

The technical effects and benefits of the system and methods described above allow cogging torque to effect a desired torque response of an actuator, a sensing of the torque, and the use of a torque overlay function and variable stiffness function.

While the invention has been described with reference to exemplary embodiments, it will be understood by those of ordinary skill in the pertinent art that various changes may be made and equivalents may be substituted for the elements thereof without departing from the scope of the present disclosure. In addition, numerous modifications may be made to adapt the teachings of the disclosure to a particular object or situation without departing from the essential scope thereof. Therefore, it is intended that the Claims not be limited to the particular embodiments disclosed as the currently preferred best modes contemplated for carrying out the teachings herein, but that the Claims shall cover all embodiments falling within the true scope and spirit of the disclosure.

What is claimed is:

1. An actuator assembly comprising:
    a first shaft;
    a single torsion bar providing magnetic torque without a coil responsive to a torque input to said first shaft including
    a tooth assembly having an inner tooth and an outer tooth connected to a second shaft; and
    a magnet disposed between said inner tooth and said outer tooth, said magnet operative to interact with said tooth assembly to induce torque between said first shaft and said second shaft.

2. The actuator assembly of claim 1, wherein said assembly further includes:
    an upper housing portion;
    a lower housing portion;
    an airgap partially defined by said upper housing portion and said lower housing portion; and
    a sensor disposed in said airgap operative to sense a position of said magnet relative to said tooth assembly.

3. The actuator assembly of claim 2, wherein said sensor is a Hall Effect sensor.

4. The actuator assembly of claim 2, wherein said assembly further includes a mechanical torsion bar.

5. The actuator assembly of claim 1, wherein said magnet includes multiple pole pairs.

6. The actuator assembly of claim 1, wherein said magnet is a ring magnet.

7. The actuator assembly of claim 1, wherein said assembly further includes:
    an outer yoke portion;

a plate portion;

an airgap partially defined by said yoke portion and said plate portion; and a sensor disposed in said airgap operative to sense a position of the magnet relative to said tooth assembly.

8. The actuator assembly of claim 1, including said single torsion bar providing only magnetic torque responsive to a torque input to said first shaft.

9. The actuator assembly of claim 7, wherein said sensor is a magneto-sensitive element operative to sense a flux associated with said position of said magnet.

10. The actuator assembly of claim 7, wherein said sensor is a Hall Effect sensor.

11. The actuator assembly of claim 7, wherein said magnet is a ring magnet.

12. A steering system having an assembly for providing torque between a handwheel and a shaft comprising:

a handwheel operative to receive a torque input from a user;

an actuator assembly having a first shaft connected to said handwheel;

a single torsion bar providing magnetic torque without a coil responsive to said torque input to said first shaft, including a tooth assembly having an inner tooth and an outer tooth connected to a second shaft and a magnet disposed between said inner tooth and said outer tooth, said magnet operative to interact with said tooth assembly to induce torque between said first shaft and said second shaft.

13. The steering system of claim 12, further including a mechanical torsion bar.

14. The steering system of claim 12, including said single torsion bar providing only magnetic torque responsive to a torque input to said first shaft.

15. A steering system having an assembly for providing torque between a handwheel and a shaft comprising:

a handwheel operative to receive a torque input from a user;

an actuator assembly having a first shaft connected to said handwheel;

an electromagnetic torsion bar providing electromagnetic torque responsive to said torque input and configured to impart a torque response without a mechanical torsion bar, including a tooth assembly having an inner tooth and an outer tooth connected to a second shaft and a magnet disposed between said inner tooth and said outer tooth, said magnet operative to interact with said tooth assembly to induce torque between said first shaft and said second shaft.

16. The steering system of claim 15, wherein said actuator assembly further includes a coil to induce a secondary flux field that imparts a torque overlay between said first shaft and said second shaft.

17. The steering system of claim 15, wherein said actuator assembly further includes a coil operative to induce a secondary flux field that varies or provides a non-linear torsional stiffness between said first shaft and said second shaft.

* * * * *